Sept. 3, 1968  W. BACK  3,399,567

FLOW METER

Filed Feb. 18, 1966

Inventor:
Walter Back by Michael J. Striker
Attorney

United States Patent Office 3,399,567
Patented Sept. 3, 1968

3,399,567
FLOW METER
Walter Back, Mannheim-Schonau, Germany, assignor to Bopp & Reuther G.m.b.H., Mannheim-Waldhof, Germany
Filed Feb. 18, 1966, Ser. No. 528,483
Claims priority, application Germany, Mar. 5, 1965, B 80,828, Patent 1,220,626
5 Claims. (Cl. 73—230)

ABSTRACT OF THE DISCLOSURE

A flow meter having a rotor with a plurality of vanes having peripheral edge portions located on a common imaginary spherical surface and being arranged turnably about an axis in a cylindrical housing portion of uniform cross-section, and guide means in the housing portion extending upstream of the rotor transverse to the flow of fluid through the housing portion to such an extent that fluid will impinge on the rotor only to one side of its axis.

---

Figure 1:
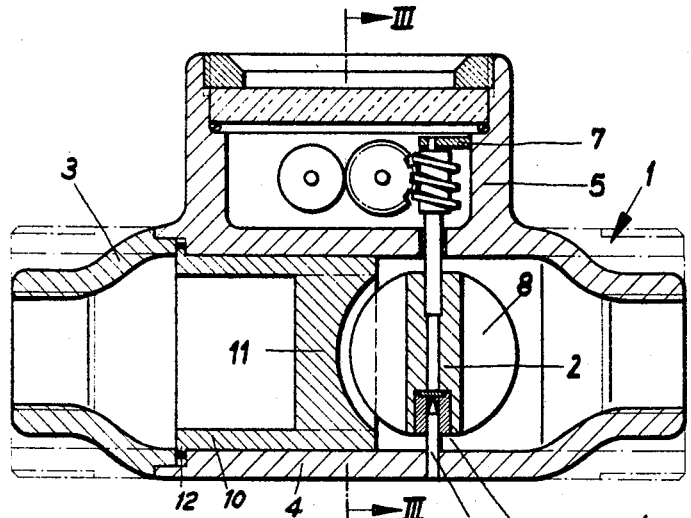

The present invention relates to a flow meter having a rotor provided with a plurality of vanes extending substantially normal to the flow of a fluid through the meter and which are impinged at one side of the axis of the meter by the fluid to be measured. Flow meters of this type are known in the art in which the rotor is arranged in an enlarged portion of a housing and is impinged laterally of the axis thereof by a single fluid jet.

Flow meters of this known type have various disadvantages, especially the housing with the enlarged portion in which the rotor is located is difficult to manufacture since such a housing can usually only be produced as a sand casting. Such housings are not only relatively heavy, but for each size of the flow meter a corresponding housing has to be manufactured. In addition, the upper or the lower limits of the measuring range for a certain flow meter size and a certain amount of fluid flowing therethrough are relatively narrow with flow meters according to the known art.

It is an object of the present invention to overcome these disadvantages of flow meters of the aforementioned type known in the art.

It is an additional object of the present invention to provide for a flow meter which is, as compared with flow meters known in the art, of much simpler construction.

It is a further object of the present invention to provide for a flow meter of the aforementioned type which is composed of relatively few and simple parts so that the flow meter can be manufactured at very reasonable cost and will stand up trouble free under extended use.

With these objects in view, the flow meter according to the present invention mainly comprises a tube-like housing having a major portion of uniform cross section and opposite open ends so that a fluid to be measured may flow in one direction through the housing, a rotor mounted in said major portion of said housing turnably about an axis substantially normal to said one direction and having a plurality of vanes extending in radial direction from said axis and having peripheral edge portions spaced a small clearance from the inner surface of said housing, and guide means arranged in said housing upstream of the rotor and extending transverse to said one direction partially through said housing to an extent so as to prevent flow of fluid through at least that part of said cross section which is located at one side of the axis so that the fluid will impinge at the most onto half of the rotor located at the other side of its axis.

In a preferred form the cross section of the major portion of the housing is circular and the peripheral edge portions of the vanes of the rotor are located on a substantially spherical imaginary surface. The tubular housing preferably includes also an annular portion projecting in direction of the axis of the rotor to one side of the tubular housing and the rotor has a shaft extending along the aforementioned axis in the annular portion in which counter means are located connected to the shaft to be driven thereby during rotation of the rotor. The annular portion may be directly molded or diecast together with the tube-like housing or the annular portion may be welded or cemented to the remainder of the housing.

The housing of the flow meter according to the present invention is therefore extremely simple and it can be diecast or molded without difficulty for instance from plastic material. The housing provides also for an advantageous fluid flow therethrough so that pressure losses in the housing will be reduced as compared to flow meters known in the art. The guide means in the housing may likewise be molded from plastic material and can easily be exchanged against guide means having a different configuration so that a meter of one size can be easily adapted for different measuring ranges. It is for instance possible to construct the flow meter of the present invention for a measuring range of 1 to 250, whereas the measuring range for flow meters known in the art is about 1 to 100. The lower limit of the measuring range can also be considerably reduced. Furthermore, the exactness of the measurement of the flow meter according to the present invention is practically independent from the clearance between the peripheral surface of the rotor and the inner surface of the tube-like housing. The weight of the flow meter according to the present invention is only about a fifth of the weight of flow meters of the same size known in the art. The flow meter according to the present invention is also much more frost resistant than flow meters according to the prior art in that liquid in the flow meter can be completely discharged when the same is taken out of service due to danger of frost which is not possible with flow meters according to the prior art.

Figure 2:
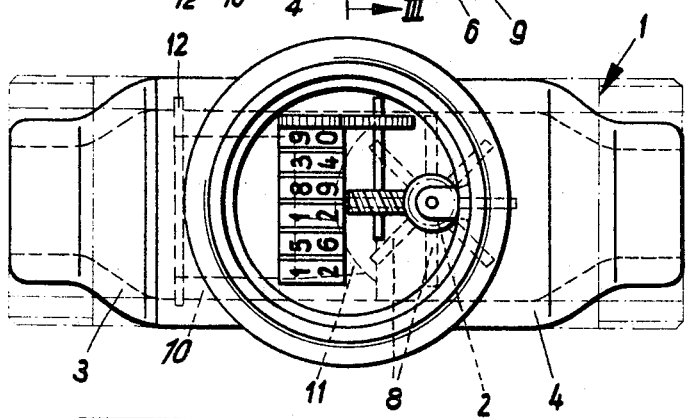
Figure 3:
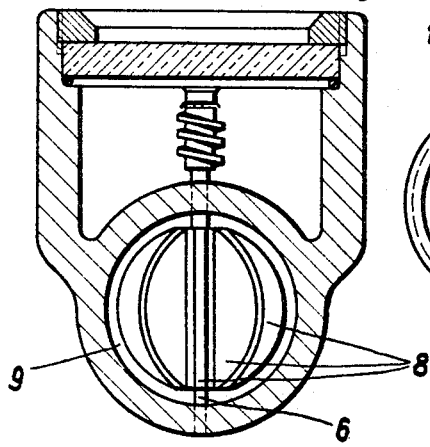
Figure 4:
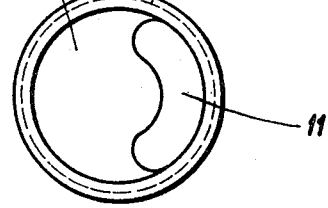

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a longitudinal section through the flow meter according to the present invention;
FIG. 2 is a top view thereof;
FIG. 3 is a cross section taken along line III—III of FIG. 1; and
FIG. 4 is a front view of the guide means used in the flow meter.

Refering now to the drawings, it will be seen that the flow meter according to the present invention has a tube-like housing 1 having a major portion of uniform preferably circular cross section and opposite open ends so that the fluid to be measured may flow in one direction through the housing. In the form illustrated in FIG. 1 in full lines, the opposite end portions of the housing are slightly reduced in diameter for connecting the housing to pipes, not shown in the drawing, for feeding the fluid to be measured into and out of opposite ends of the housing. However, it is also possible to construct the housing, as shown in dash-dotted lines in FIG. 1, with a uniform cross section throughout the length thereof and the outer ends of the housing may be formed with outer screw threads for connecting the pipes thereto. In the form of the housing as shown in full lines in FIG. 1, the housing 1 is preferably made out of two parts 3 and 4 which may threadedly connected to each other to facilitate insertion of the rotor 2 into the housing 1. An annular portion 5 is provided projecting upwardly from the housing portion 4 and this annular portion 5 may be integrally molded with the housing portion 4 or connected thereto by welding or cementing. The open upper end of the annular portion 5 is preferably closed by a glass plate held in place against a shoulder of the annular portion by a ring which may be threadedly connected to a correspondingly threaded upper end of the annular portion 5. Counter means of known construction are located in the annular portion 5 beneath the glass plate and the counter means are connected by appropriate gearing to the shaft of the rotor 2.

A pin 6 projecting in vertical direction upwardly through a lower wall portion of the housing 1 engages in a bushing of the rotor 2 and the shaft of the rotor extends fluid-tightly sealed in vertical direction aligned with the pin 6 through an upper wall portion of the housing into the annular portion 5 where the upper end of the shaft may be rotatably mounted in a projection 7. The rotor 2 has a plurality of radially extending vanes 8. In a preferred form, the inner surface of the major portion of the housing in which the rotor 2 is located is cylindrical and in this case the peripheral edge portions of the vanes 8 are preferably located on a common imaginary substantially spherical surface. While the rotor 2 is illustrated with eight vanes 8, the number of the vanes is immaterial for the proper functioning of the flow meter and the number of vanes may be greater or smaller than eight. Likewise the outer contour of the vanes may be varied and while the contour shown in the drawings is considered preferable, different contours may also be provided and it is essential only that the outer contour of the vanes conforms to the cross section of the interior of the housing so that only a relatively small clearance will exist between the edge portions of the vanes and the inner surface of the housing portion in which the rotor is located.

Guide means 10 are provided in the housing 1 upstream of the rotor 2 to direct the flow of fluid through the housing to one side of the rotor only. The guide means 10 have a transverse wall portion which extends at least through that part of the open cross section of the housing which extends between the inner surface thereof and the axis of the rotor so that the fluid will impinge at the most onto half of the rotor located to one side of the axis. The transverse wall portion of the housing is formed with an excentric opening 11 through which the fluid passes and impinges on the rotor vanes 8 located rearwardly of the opening 11. The guide means 10 may also have a tubular portion extending away from the rotor and the tubular portion may have at the free end thereof an outwardly extending annular flange 12 which may be clamped between shoulder faces of the housing part 3 and 4, as shown in FIG. 1, to thereby hold the guide means 10 at a fixed position within the housing. Evidently, the guide means 10 may be easily exchanged against guide means having an opening 11 of different cross section and/or contour by unscrewing the housing part 3 from the housing part 4 and by then clamping another guide means in place in the manner as shown in FIG. 1. By providing guide means having openings 11 of different contour and cross section and by placing different guide means into the housing, the flow meter according to the present invention may easily be adapted for different operating conditions.

It is for instance possible to provide a relatively large opening 11 in the guide means when low speed of rotation of the rotor is desired. A small opening 11 is however advantageous if an exact measurement at the lower limit of the measuring range is desirable. If, however, an exact measuring at the lower limit of the measuring range is not necessary it is preferred to provide a relatively large opening 11 in the guide means 10. In this way it is possible to adapt the flow meter to various operating conditions whereby the same housing may be used and only the guide means be exchanged. The transverse wall portion of the guide means 10 is preferably provided at the sides thereof facing the rotor 2 with a cavity defined by part of a spherical surface.

A further adjustment of the flow meter may be carried out by changing the position of the guide means 10 relative to the rotor 2. Since the housing 1 has a uniform cross section over at least a major part thereof such a change of the position of the guide means 10 with respect to the rotor 2 is easily possible and if a change of position of the guide means 10 is desirable the latter is not formed with an annular rim 12 as shown in FIG. 1, so that the guide means 10 may be moved in longitudinal direction of the housing toward and away from the rotor 2. In this case, the guide means 10 may be held in any adjusted position, for instance by one or a plurality of screws extending through the wall of the housing portion 4 and engaging with the inner ends thereof the tubular portion of the guide means 10. Instead of guide means 10 as shown in the drawing, it is of course also possible to provide an adjustable flap upstream of the rotor 2 in the housing to direct the fluid passing through the interior of the housing to one side of the rotor only. It is also possible to provide the transverse wall portion of the guide means with a plurality of cylindrical or conical bores to one side of the rotor axis instead of the single opening 11 shown in FIG. 4.

It will be understood that each of the elements described above, or two or more together, may also find a useful application in other types of flow meters differing from the types described above.

While the invention has been illustrated and described as embodied in a flow meter having a tube-like housing having a major portion of uniform cross section, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A flow meter comprising, in combination, a tube-like housing having a major cylindrical portion of uniform cross section and opposite open ends so that a fluid to be measured may flow in one direction through said housing; a rotor mounted in said major portion of said housing turnably about an axis substantially normal to said one direction, said rotor having a plurality of vanes extending in radial direction from said axis and having peripheral edge portions located on a common imaginary substantially spherical surface spaced a small clearance from the inner surface of said housing; and guide means arranged in said major portion of said housing upstream of said rotor and extending transverse to said one direction partly through said housing to an extent so as to prevent flow of fluid through at least that part of said cross section which is located at one side of said axis so that the fluid will impinge at the most onto half of the rotor located at the other side of said axis, said guide means being mounted in said housing so that the position thereof relative to said rotor may be adjusted.

2. A flow meter comprising, in combination, a tube-like housing having a major cylindrical portion of uniform cross section and opposite open ends so that a fluid to be measured may flow in one direction through said housing; a rotor mounted in said major portion of said housing turnably about an axis substantially normal to said one direction, said rotor having a plurality of vanes extending in radial direction from said axis and having peripheral edge portions located on a common imaginary substantially spherical surface spaced a small clearance from the inner surface of said housing; and guide means arranged in said major portion of said housing upstream of said rotor and extending transverse to said one direction partly through said housing to an extent so as to prevent flow of fluid through at least that part of said cross section which is located at one side of said axis so that the fluid will impinge at the most onto half of the rotor located at the other side of said axis, said guide means having an annular wall portion having an outer surface engaging the inner surface of said major portion of said housing and a transverse wall portion at the end thereof facing said rotor, said transverse wall portion being formed with an opening therethrough extending from the inner surface of said annular wall portion at most up to a plane extending in said one direction and including said axis.

3. A flow meter as set forth in claim 2, wherein said annular wall portion is cylindrical and wherein said transverse wall portion is formed at the side thereof facing said rotor with a cavity defined by a spherical surface having a center substantially coinciding with that of said imaginary spherical surface.

4. A flow meter as set forth in claim 3, wherein said tube-like housing is formed from two tubular portions aligned along a common axis and releasably connected to each other with facing edge portions thereof spaced from each other and wherein said cylindrical wall portion of said guide means has at the end thereof facing away from the rotor an annular ring clamped between said edge portions of said two tubular housing parts.

5. A flow meter comprising, in combination, a tube-like housing having a major cylindrical portion of uniform cross section and opposite open ends so that a fluid to be measured may flow in one direction through said housing; a rotor mounted in said major portion of said housing turnably about an axis substantially normal to said one direction, said rotor having a plurality of vanes extending in radial direction from said axis an having peripheral edge portions located on a common imaginary substantially spherical surface spaced a small clearance from the inner surface of said housing; guide means arranged in said major portion of said housing upstream of said rotor and extending transverse to said one direction partly through said housing to an extent so as to prevent flow of fluid through at least that part of said cross section which is located at one side of said axis so that the fluid will impinge at the most onto half of the rotor located at the other side of said axis; an annular portion projecting in direction of said axis to one side of said tube-like housing and being fixed thereto; a shaft for said rotor extending along said axis into said annular portion; and counter means located in said annular portion and connected to said shaft.

References Cited
UNITED STATES PATENTS

| | | | |
|---|---|---|---|
| 910,475 | 1/1909 | Kenny | 73—229 |
| 2,346,037 | 4/1944 | McCormick | 73—229 |
| 2,667,072 | 1/1954 | Webster | 73—230 |

FOREIGN PATENTS 436,856  11/1926  Germany.

RICHARD C. QUEISSER, *Primary Examiner.*

EDWARD D. GILHOOLY, *Assistant Examiner.*